April 4, 1961  I. M. DAVIDSON  2,978,204
AIRCRAFT FLYING CONTROL SYSTEMS
Filed Sept. 12, 1956  5 Sheets-Sheet 2

Inventor
Ivor Macaulay Davidson
By
Stevens, Davis, Miller & Mosher
his Attorneys April 4, 1961    I. M. DAVIDSON    2,978,204
AIRCRAFT FLYING CONTROL SYSTEMS
Filed Sept. 12, 1956    5 Sheets-Sheet 3

Inventor
Ivor Macaulay Davidson
By
Stevens, Davis, Miller & Mosher
his Attorneys – # United States Patent Office 2,978,204
Patented Apr. 4, 1961

2,978,204
AIRCRAFT FLYING CONTROL SYSTEMS

Ivor Macaulay Davidson, Farnborough, England, assignor to Power Jets (Research and Development) Limited, London, England, a British company Filed Sept. 12, 1956, Ser. No. 609,450

Claims priority, application Great Britain Sept. 28, 1955

10 Claims. (Cl. 244—15)

This invention relates to flying control systems for aircraft, and particularly though not exclusively for aircraft of the type described in copending United States patent application Serial No. 543,212, filed October 27, 1955, in names of the present applicant and B. S. Stratford.

In these applications there is described an aircraft having a number of jet engines which discharge propulsive jet streams through shallow elongated jet nozzles extending spanwise along the wings and arranged so that the combined jet streams leave the trailing edge of each wing as a long thin continuous spanwise extending sheet. Preferably each jet sheet extends as nearly as possible from wing tip to root, consistent with structural requirements. Means are provided for deflecting the jet sheets from the two wings upwardly and downwardly together to vary the lift on the aircraft and thus act as flying controls equivalent to landing flaps and elevators in conventional aircraft, and also differentially for lateral control to simulate the action of ailerons.

The present invention is based on the realisation that, for the equivalent of flap control, a comparatively large range of deflection of the two jet sheets is required while for the equivalent of elevator and aileron control the range of deflection required is comparatively small, and moreover such small deflections may be required about any position of the jet sheet within the larger range.

The same considerations arise in an aircraft having other forms of lift control means, e.g. wing flaps, at the wing trailing edges if such means are to be equivalent to flaps, elevators and ailerons as used in conventional aircraft.

Accordingly the invention provides an aircraft comprising a pair of wings having lift control means for varying the lift produced by the wings, extending along their trailing edges, and means to vary the setting of the lift control means in a sense to increase the lift on both wings by a comparatively large amount and also to vary the lift on the two wings by comparatively small amounts either in the same sense or differentially at will.

The lift control means may comprise means for discharging rearwardly directed propulsive jet streams as long thin jet sheets extending spanwise along the rear of each wing and jet deflectors for deflecting the jet sheets upwardly or downwardly from the rearward direction, and means may be provided to operate the jet deflectors to deflect the two jet sheets downwardly together through a comparatively large angle and also to deflect the two jet sheets upwardly and downwardly through a comparatively small angle about any given position of the jet sheet either together or differentially at will.

Alternatively the lift control means may comprise trailing edge wing flaps on each wing and means may be provided to lower the two flaps together through a comparatively large angle and also to raise and lower the two flaps through a comparatively small angle about any given position of the flaps either together or differentially at will.

In either case there may be a pilot's control connected to the jet deflectors or the flaps through a linkage and movable to effect the comparatively small movements, the linkage including a variable length link, and means being provided to increase the length of the link to effect the comparatively large movements.

It may be necessary in any aircraft provided with lift control means, i.e. jet sheets or trailing edge wing flaps, as referred to above, to reduce the forward speed of the aircraft, e.g. preparatory to landing. The invention further provides an arrangement whereby the lift control means are used as air brakes.

Accordingly the invention in another aspect provides an aircraft comprising a wing having lift control means for varying the lift produced by the wing extending along its trailing edge and divided spanwise into at least two sections, and means for setting one section at an angle to the other section, the two sections being angularly movable together with or without an angular displacement between them.

Again, the lift control means may comprise means for discharging a rearwardly directed propulsive jet stream as a long thin jet sheet extending continuously spanwise along the rear of the wing and a jet deflector for deflecting the jet sheet upwardly and downwardly from the rearward direction and divided in a spanwise sense into at least two sections. Alternatively they may comprise a trailing edge wing flap divided in a spanwise sense into at least two sections.

The invention will now be more fully described by way of example with reference to the accompanying diagrammatic drawings, of which:

Figure 1:
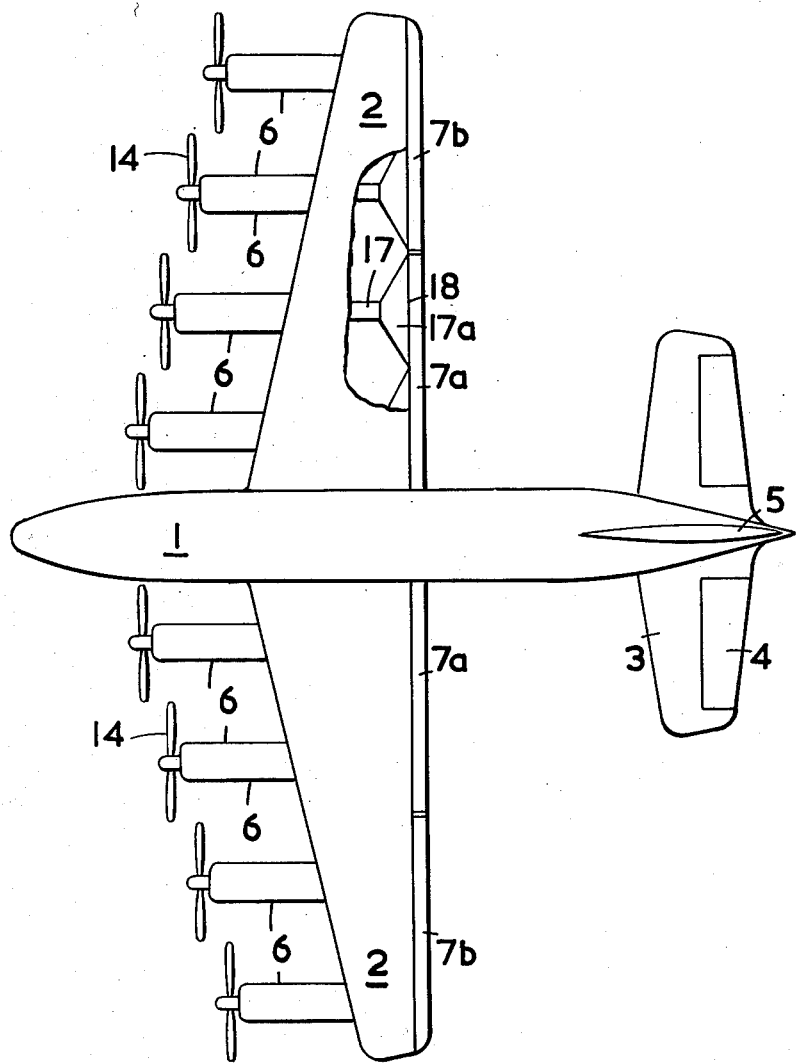
Figure 1 is a plan view of an aircraft, part of the upper surface of one wing being shown as broken away.

In Figure 1, the aircraft comprises a fuselage 1, lying along the aircraft fore and aft centre line, wings 2 extending one on each side thereof, a tailplane 3 having an elevator 4, and a fin and rudder 5. The aircraft is powered by eight turbo-prop engines, four in each wing, the engines being mounted in nacelles 6 extending forwardly from the wing leading edges in the usual manner.

Figure 2:
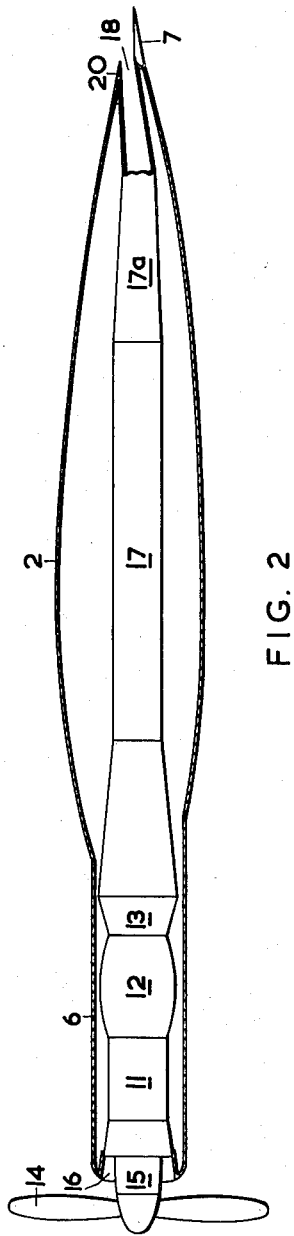
Figure 2 is a fore and aft cross-sectional view through one wing of the aircraft shown in Figure 1.

Referring now to Figure 2, each engine comprises a compressor 11, combustion system 12 and turbine 13 with the usual auxiliaries and drives a propeller 14 at the front of the engine through a gear box 15. Air for the compressor is drawn in through an annular intake 16 in the front of the nacelle. The turbine discharges its exhaust stream through a jet pipe 17 which extends chordwise through the wing and includes a rear transition portion 17a which changes progressively in cross-section from circular to terminate in a shallow elongated spanwise extending jet nozzle 18. As shown in Figure 1 the nozzles in each wing are contiguous at their ends and together constitute a jet nozzle aperture extending continuously spanwise of the wing as nearly as possible from root to tip constant with structural requirements, from which the exhaust gas streams are discharged as a long jet sheet also extending substantially from wing tip to root.

Figure 4:
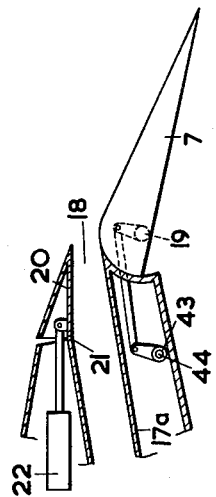
Figures 3 and 4 are enlarged cross-sectional views of the trailing edge of the wing.

Mounted at the rearward extremity of each wing is a jet deflector in the form of a hinged trailing edge wing flap 7 which, as shown in Figure 1, is divided in a spanwise sense into equal inboard and outboard sections 7a, 7b. The jet nozzles 18 are arranged at the junction of the wing flap with the fixed part of the wing so that the jet sheet is discharged over the upper surface of the flap. As shown most clearly in Figure 3, the nozzles are directed to discharge the jet sheet upwardly at a small angle, say 10 to 15% to the horizontal, but when the flap is in its datum position shown in Figure 3 with its upper surface horizontal, it induces the sheet to follow a path along its upper surface (due to Coanda effect) so that the sheet is discharged in a rearward direction. The flap is mounted for pivotal movement about an axis 19 (by means to be described below). It may be turned downwardly as shown in Figure 4, in which case the jet sheet is induced to follow its upper surface so that it is discharged in a downwardly inclined direction. The flap can also be turned upwardly so that the jet sheet is allowed to deflect upwardly. This may be preferable to using upward movement of the flap to force the jet sheet upwardly.

The flap is shown as being pivoted about an axis within the wing profile, but it may be mounted in guides so that it turns about a virtual axis below the wing.

Figure 8:
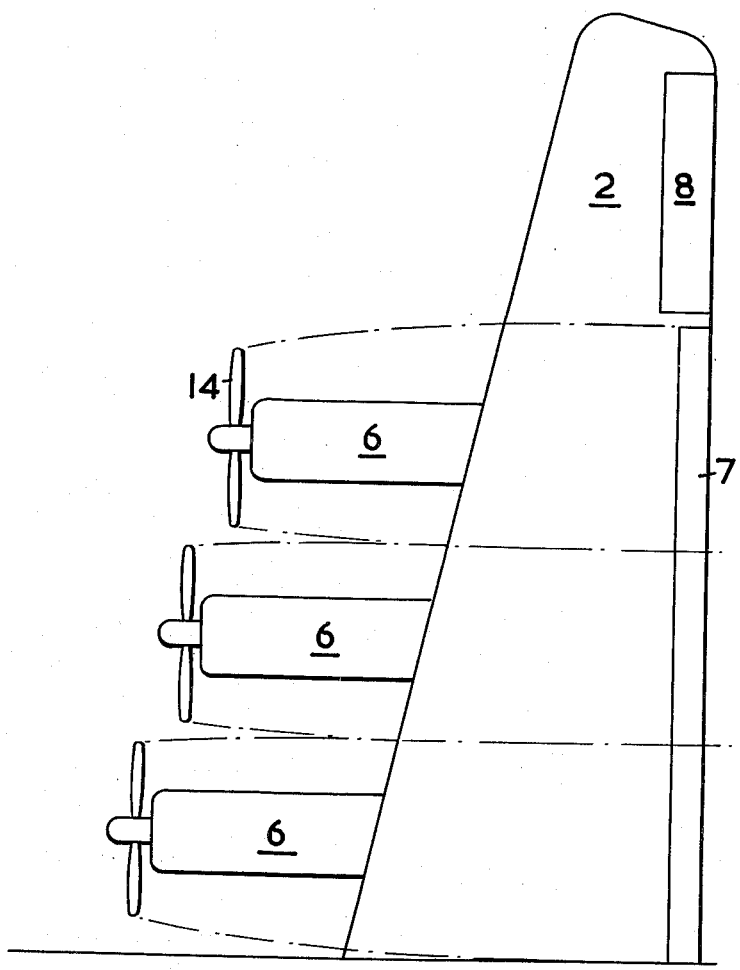
Figure 8 is a plan view of one wing of another aircraft showing a modified form of the invention.

Although the nozzles 18 and the flaps 7 preferably extend along substantially the full span of each wing, structural requirements may in some cases make it necessary to restrict their spanwise extent. Thus as shown in Figure 8, the flap 7 and the nozzles 18 extend along as little, as but not substantially less than, two thirds of the full span of the wing. In any case they extend along a major part, i.e. more than 50%, of the wing span. In this embodiment, the wing is provided with ailerons 8 outboard of the flaps.

The flap 7 need only be of quite short chord say, 2 to 5% of the total local wing chord, and in any case not more than about 10 or 12%.

The upper edges of the jet nozzles 18 are defined by a small flap 20 (which may be divided spanwise into sections corresponding to the nozzles 18) hinged about a transverse axis 21 and movable by means of a hydraulic jack 22 to vary the area of the jet nozzle.

The turbo-prop engines and their propellers are so arranged in each wing that the propeller slipstreams together extend continuously along substantially the full span of the wing. As shown in Figure 1 the engines and propellers are progressively set back along the swept back leading edge of the wing and in frontal view the propeller discs overlap to a small extent. This overlap however may not always be necessary. In the embodiment of Figure 8 (in which there are only three engines in each wing 2) the individual slipstreams from the propellers 14 are shown as having spread laterally to fill the gaps between them (as indicated by the dotted lines) by the time they reach the rear of the wing. In any case however the spanwise extent of the combined slipstreams is preferably not less than the spanwise extent of the jet nozzles 18 and flap 7.

When the jet sheet from a wing is deflected downwardly it acts as a jet flap which interacts with the slipstream from the propellers and with the main stream flow around the wing in such a way that the aerodynamic pressure distribution over the wing is considerably modified and the aerodynamic lift on the wing substantially increased, the increase becoming greater with increased deflection of the jet sheet. Thus by varying the deflection of the jet sheets by means of the flaps 7, the lift on the wings of the aircraft can be controlled in the manner described in said copending application Serial No. 543,212.

Figure 5:
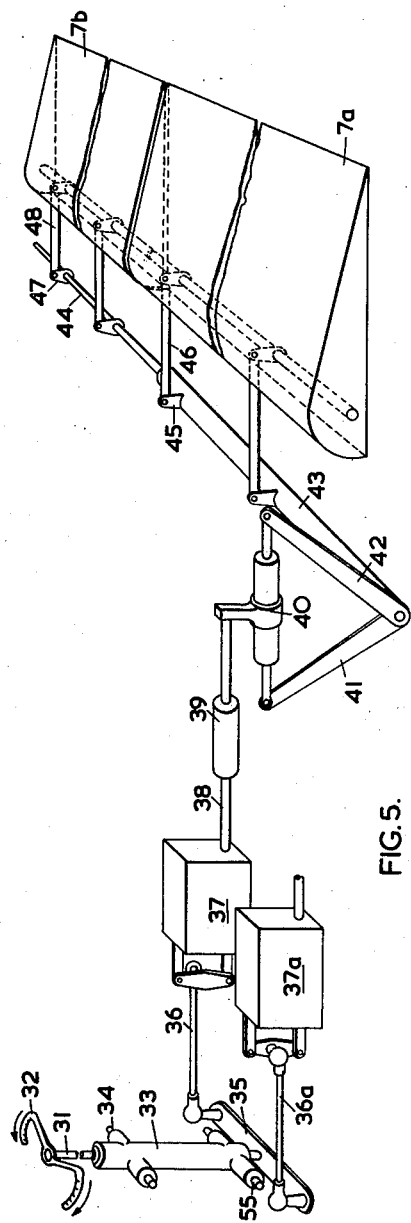
Figures 5 and 6 are schematic views of parts of the aircraft flying control system.
Figure 6:
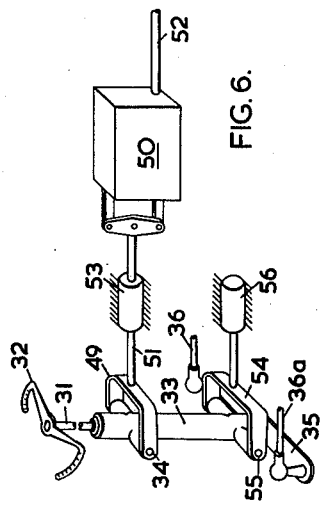

The flaps 7 and the elevators 4 are actuated by the control system shown in Figures 5 and 6; these show parts of the same system but part has been omitted from each for the sake of clarity, Figure 5 showing only the part for operating the flaps and Figure 6 only the part for operating the elevators. The system (part of which is the same as that described in copending United States patent application Serial No. 447,200, filed August 2, 1954, now abandoned, in the name of the present applicant) comprises a pilot's control column 31 having a handwheel 32 on top and rotatably mounted in a tubular casing 33 which is itself rotatable about a horizontal axis in bearings 34. To the lower end of the column 31, below the pivotal axis of the casing, is secured a transverse lever 35 to the ends of which are jointed links 36, 36a connected to flap actuators of known type shown diagrammatically at 37, 37a (see Figure 5). Each actuator operates the flap in one wing through an extendable rod 38 incorporating a hydraulic jack 39 (thus constituting a variable length link) connected at its end to the mid point of a double ended hydraulic jack 40 connecting the ends of two levers 41, 42. These levers are rigidly mounted on the ends of two coaxial torsion bars 43, 44 respectively, extending spanwise within the wing and nested one within the other. The outer torsion bar 43 carries cranks 45 for operating the inboard section 7a of the flap through links 46 while the inner torsion bar 44 projects beyond the end of the outer torsion bar 43 and is similarly connected to operate the outboard section 7b of the flaps by means of cranks 47 and links 48.

It will of course be understood that Figure 5 shows the flying controls for one wing only, and that the actuator 37a is similarly connected to operate the flap 7 in the other wing.

The control column is also operable to actuate the elevators 4. A bracket 49 (see Figure 6) connects the bearings 34 on the casing 33 to an actuator 50 through a rod 51, the actuator being connected to the elevators through link 52. The rod 51 includes a hydraulic lock 53. A further bracket 54 is connected to bearings 55 on the casing 33 and is linked to a second hydraulic lock 56. The column can pivot either about bearings 34 or about bearings 55 depending upon whether lock 53 or lock 56 is set in the locked position.

Figure 7:
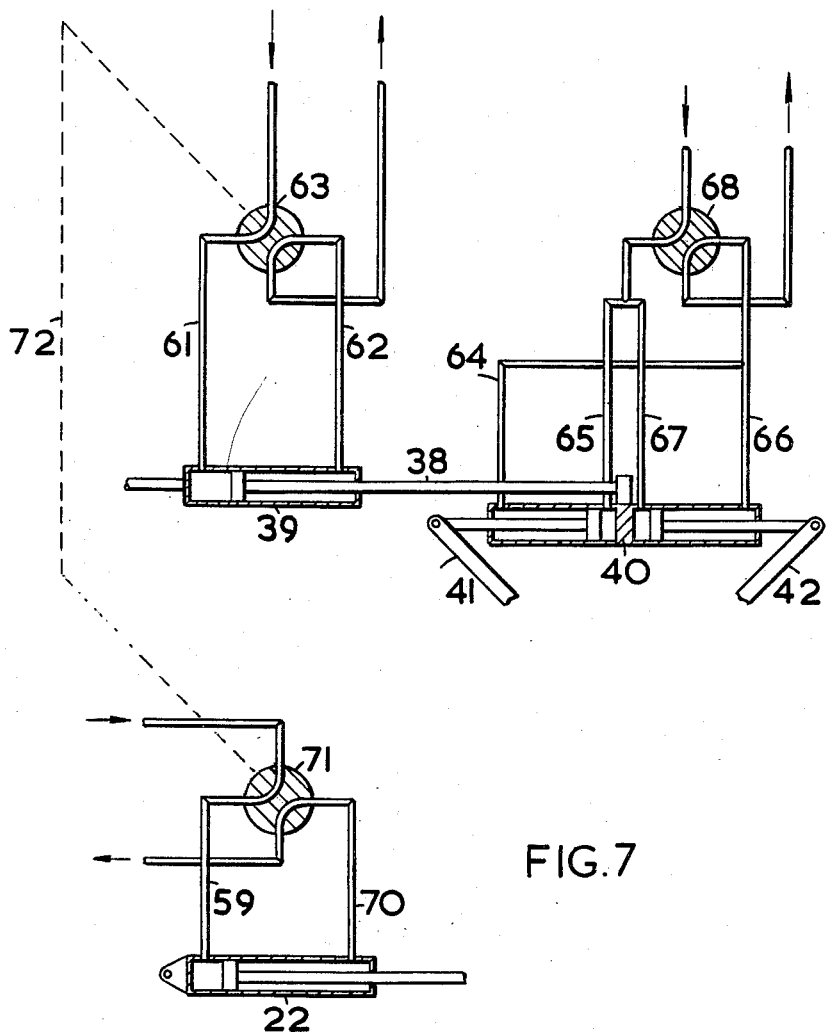
Figure 7 is a diagram showing the hydraulic system for actuating certain components of the flying control system.

As shown in Figure 7 the hydraulic jack 39 is supplied with hydraulic fluid through pipes 61, 62 and reversing valve 63. Similarly the double ended hydraulic jack 40 is supplied with hydraulic fluid through pipes 64, 65, 66, 67 and a common reversing valve 68. This figure also shows the hydraulic jack 22 for operating the flap 20 (see Figures 3 and 4) which is supplied with hydraulic fluid through pipes 69 and 70 and reversing valve 71. As indicated diagrammatically by the dotted lines at 72 the valves 63 and 71 are under a common control separate from the control column as will be explained more fully below. The valves 63, 68, 71 shown are connected to control the supply of hydraulic fluid to the corresponding jacks in both wings.

Figure 3:
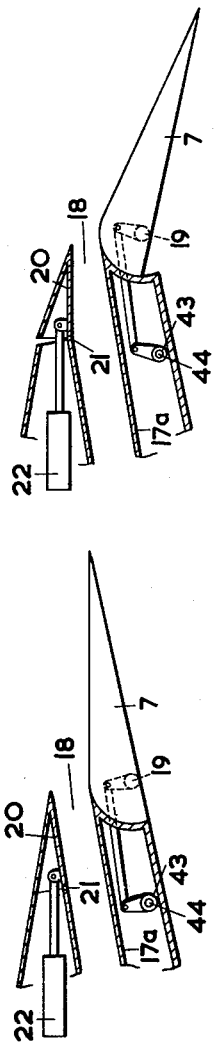

For normal forward flight, the wing flap 7 is set in the datum position shown in Figure 3 so that the jet sheet is discharged rearwardly, and the flap 20 is in the position corresponding to the jet nozzle 18 being fully open. Under these conditions, the back pressure on the turbines 13 is small and practically all the engine power goes to drive the propellers 14, only a comparatively small amount of thrust being obtained from the exhaust streams. The hydraulic lock 53 is set in its locked position so that the elevators 4 are inoperative and the control column and casing are free to pivot about the bearings 34. By moving the column bodily about these bearings the two flaps can be moved upwardly or downwardly together thereby deflecting the two jet sheets upwardly and downwardly to decrease or increase the lift on the wings together and thus to give a control which is an alternative to elevator control in a conventional aircraft. If the column 31 is turned in its casing 33 the flaps are moved and the jet sheets deflected differentially to vary the lift on one wing relatively to the lift on the other and thus to give the equivalent of aileron control in a conventional aircraft. The movement of the flaps which can be effected by the control column is comparatively small, say 10° and in any case not more than about 20° upwardly or downwardly.

For steady flight at supersonic speeds, the lock 53 may be unlocked and the lock 56 set in the locked position. In this case, the control column will be free to pivot about bearings 55 and bodily movement thereof will operate the elevators 4 in the usual manner. It will however still be possible to turn the control column 31 in the casing 33 to operate the flaps 7 differentially to give the equivalent of aileron control.

In an alternative arrangement the whole tailplane may be mounted for pivotal movement in response to movement of the control column, and, in any case, it may be angularly adjustable for trimming purposes.

For take off and landing, the reversing valve 63 is turned to the position shown in Figure 7 to supply hydraulic fluid to extend jacks 39 so that the flaps 7 in each wing are lowered through a comparatively large angle which may be as much as 70°. The jet sheets tend to follow the flap upper surfaces and are thus deflected downwardly through a corresponding angle. At the same time the hydraulic jacks 22 are also actuated by means of the common control 72 indicated in Figure 7 to move the flaps 22 to reduce the jet nozzle area with the result that the engine power output is redistributed so that a greater proportion goes to the jet stream. The downwardly directed jet sheets leaving the rear of the wings act as "jet flaps" which give rise to a substantial increase in the aerodynamic lift on the wings as explained above.

It will be seen that when the flaps are lowered they are still movable either together or differentially by means of the pilot's control column through a comparatively small angle on either side of their lowered position so that control of the aircraft on landing or take off can be effected.

The flap lowering mechanism may be such that the flaps can be lowered to any one of a number of positions, e.g., to one position for landing and to another for take off.

When coming in to land it is necessary to reduce the forward speed of the aircraft, and accordingly provision is also made for using the flaps 7 as air brakes. The valve 68 is turned to the position shown in Figure 7 so that hydraulic fluid is supplied to the double ended jack 40 so that it is extended to force apart the levers 41, 42. These turn the torsion bars 43, 44 so that the inboard and outboard sections 7a, 7b, of the flaps in each wing and the corresponding sections of the jet sheets are set "out of phase," i.e., at an angle to one another. Vortices are thereby set up at the junctions of the sections of the flaps and jet sheets, giving rise to an increase in induced drag which effects a reduction in the forward speed of the aircraft.

As the speed of the aircraft is reduced, the sections of each flap are returned to the "in phase" position, and this might be done automatically by a control dependent, for example, on forward speed. At the same time the flaps 7 may be lowered and the jet nozzle area reduced so that increased lift due to the "jet flap" effect will compensate for the reduction of lift due to reduction of forward speed.

The flaps 7 may of course be divided into a greater number of sections. It will be seen that the flaps 7 can be operated by the pilot's control column in the manner previously described whether they are set "in phase" or with a selected angular displacement between them, i.e. the flaps can be operated to deflect the jet sheets upwardly or downwardly about any given position thereof.

I claim:

1. An aircraft comprising a fuselage; a single pair of opposite wings attached to the fuselage, one on each side thereof, each wing having a trailing edge wing flap; a horizontal stabiliser attached to the fuselage and spaced from the wings; operating means to raise and lower the flaps; a first control member operatively connected to said operating means and operable to raise and lower the flaps together through a comparatively large range of angular movement between a datum position and a lowered position; and a second control member operatively connected to said operating means and operable independently of the first control member in one sense to raise and lower the flaps together and in another sense to raise and lower the flaps differentially from any position of the flaps within said range of movement effected by said first control member through an angle which is small compared with said range of movement.

2. An aircraft comprising a fuselage; a single pair of opposite wings attached to the fuselage, one on each side thereof; a horizontal stabiliser attached to the fuselage and spaced from the wings; jet propulsion means arranged to discharge propulsive jet streams so that they leave the rear of each wing in a rearward direction as long thin jet sheets extending along the span of the wings; jet deflectors at the rear and extending along the span of each wing for deflecting the jet sheets upwardly and downwardly from said rearward direction; operating means for operating said jet deflectors; a first control member operatively connected to said operating means and operable to deflect the jet sheets together through a comparatively large range of angular movement between said rearward direction and a direction of discharge downwardly inclined therefrom; and a second control member operatively connected to said operating means and operable independently of the first control member in one sense to deflect the jet sheets upwardly and downwardly together and in another sense to deflect the jet upwardly and downwardly differentially from any direction of discharge within said range of movement effected by the first control member through an angle which is small compared with said range of movement.

3. An aircraft comprising a fuselage; a single pair of opposite wings attached to the fuselage, one on each side thereof, each wing having a trailing edge wing flap; a horizontal stabiliser attached to the fuselage and spaced from the wings; jet propulsion means arranged to discharge propulsive jet streams over the flaps so that the jet streams leave the rear of each flap in a rearward direction as long thin jet sheets extending along the span of the flaps, said flaps being disposed to guide the jet sheets along paths following their upper surfaces; operating means to raise and lower the flaps and hence cause the jet sheets to be deflected upwardly and downwardly from said rearward direction; a first control member operatively connected to said operating means and operable to raise and lower the flaps together through a comparatively large range of movement between a position in which they cause the jet sheets to leave the wing in said rearward direction and a position in which they cause the jet sheets to leave the wing in a direction downwardly inclined therefrom; and a second control member operatively connected to said operating means and operable independently of the first control member in one sense to raise and lower the flaps and hence deflect the jet sheets together and in another sense to raise and lower the flaps and hence deflect the jet sheets differentially from any direction of discharge between said rearward and downwardly inclined direction through an angle which is small compared with the angle between said directions.

4. An aircraft comprising a fuselage; a single pair of opposite wings attached to the fuselage, one on each side thereof, each wing having a trailing edge wing flap and rearwardly directed jet nozzle means; a horizontal stabiliser attached to the fuselage and spaced from the wings; jet propulsion means connected to discharge propulsive jet streams through said nozzle means; said nozzle means being shaped and directed to discharge the jet streams rearwardly over the flaps so that the jet streams leave the rear of each flap in a rearward direction as long thin jet sheets extending along the span of the flaps, said flaps being disposed to guide the jet sheets along paths following their upper surfaces; operating means to raise and lower the flaps and hence cause the jet sheets to be deflected upwardly and downwardly from said rearward direction; a first control member operatively connected to said operating means and operable to raise and lower the flaps together through a comparatively large range of movement between a position in which they cause the jet sheets to leave the wing in said rearward direction and a position in which they cause the jet sheets to leave the wing in a direction downwardly inclined therefrom; and a second control member operatively connected to said operating means and operable independently of the first control member in one sense to raise and lower the flaps and hence deflect the jet sheets together and in another sense to raise and lower the flaps and hence deflect the jet sheets differentially from any direction of discharge between said rearward and downwardly inclined direction through an angle which is small compared with the angle between said directions.

5. An aircraft comprising a fuselage; a single pair of opposite wings attached to the fuselage, one on each side thereof, each wing having a trailing edge wing flap; a horizontal stabiliser attached to the fuselage and spaced from the wings; actuating means for said flaps; linkage operatively connecting said actuating means to said flaps; means in said linkage operable independently of the actuating means to raise and lower the flaps together through a comparatively large range of angular movement between a datum position and a lowered position; and a control member operatively connected to said actuating means and operable in one sense to raise and lower the flaps together and in another sense to raise and lower the flaps differentially from any position within said range of movement through an angle which is small compared with said range of movement.

6. An aircraft comprising a fuselage; a single pair of opposite wings attached to the fuselage, one on each side thereof; a horizontal stabiliser attached to the fuselage and spaced from the wings; jet propulsion means arranged to discharge propulsive jet streams so that they leave the rear of each wing in a rearward direction as long thin jet sheets extending along the span of the wings; jet deflectors at the rear of each wing for deflecting the jet sheets upwardly and downwardly from said rearward direction; actuating means for said jet deflectors; linkage operatively connecting said actuating means to said jet deflectors; means in said linkage operable independently of said actuating means to operate said jet deflectors to deflect the jet sheets together through a comparatively large range of angular movement between said rearward direction and a direction of discharge downwardly inclined therefrom; and a control member operatively connected to said actuating means and operable in one sense to deflect the jet sheets upwardly and downwardly together and in another sense to deflect the jet sheets upwardly and downwardly differentially from any direction of discharge within said range of movement through an angle which is small compared with said range of movement.

7. An aircraft comprising a fuselage; a single pair of opposite wings attached to the fuselage, one on each side thereof, each wing having a trailing edge wing flap; a horizontal stabiliser attached to the fuselage and spaced from the wings; a control column; linkage operatively connecting said control column to said flaps, said linkage including at least one variable-length link connected at one end to said control column and at the other end to at least one of said flaps and operable by variation of its length to raise and lower said flaps together through a comparatively large range of angular movement between a datum position and a lowered position; and means operable independently of said control column to vary the length of said link; said control column being operable in one sense to raise and lower said flaps together and in another sense to raise and lower said flaps differentially from any position with said range of movement through an angle which is small compared with said range of movement.

8. An aircraft comprising a fuselage; a single pair of opposite wings attached to the fuselage, one on each side thereof; a horizontal stabiliser attached to the fuselage and spaced from the wings; jet propulsion means arranged to discharge propulsive jet streams so that they leave the rear of each wing in a rearward direction as long thin jet sheets extending along the span of the wings; jet deflectors at the rear of each wing for deflecting the jet sheets upwardly and downwardly from said rearward direction; a control column; linkage operatively connecting said control column to said jet deflectors, said linkage including at least one variable-length link connected at one end to said control column and at the other end to at least one of jet deflectors and operable by variation of its length to actuate said jet deflectors to deflect the jet sheets together through a comparatively large range of angular movement between said rearward direction and a direction of discharge downwardly inclined therefrom; and means operable independently of said control column to vary the length of said link; said control column being operable in one sense to actuate said jet deflectors to deflect the jet sheets upwardly and downwardly together and in another sense to actuate said jet deflectors to deflect the jet sheets upwardly and downwardly differentially from any direction of discharge within said range of movement through an angle which is small compared with said range of movement.

9. A method of operating an aircraft of the type including a fuselage and a pair of opposite wings attached thereto, one on each side thereof, each wing having angularly adjustable lift control means extending along its trailing edge and each said lift control means being divided in a spanwise sense into at least two adjacent sections comprising controlling the aircraft in direction when in normal flight by adjusting the setting of the lift control means on opposite wings differentially while maintaining the adjacent sections of each lift control means in phase with one another, and reducing the forward speed of the aircraft by setting the corresponding sections of each lift control means at an angle to the other sections and at the same time controlling the aircraft in direction by adjusting the setting of the lift control means on opposite wings differentially while maintaining constant the angle between said sections.

10. A method according to claim 9 comprising controlling the aircraft in altitude by adjusting the setting of the lift control means on opposite wings together in the same sense while in normal flight maintaining the adjacent sections of each lift control means in phase with one another and, when reducing the forward speed of the aircraft, maintaining constant the angle between said sections.

References Cited in the file of this patent

UNITED STATES PATENTS

| | | |
|---|---|---|
| 1,605,398 | Fairey | Nov. 2, 1926 |
| 2,112,755 | Back | Mar. 29, 1938 |
| 2,201,710 | Beisel | May 21, 1940 |
| 2,271,509 | Rouanet | Jan. 27, 1942 |
| 2,381,721 | Carroll | Aug. 7, 1945 |
| 2,407,401 | Clauser | Sept. 10, 1946 |
| 2,639,108 | Feeney | May 19, 1953 |
| 2,643,076 | Hurel | June 23, 1953 |

FOREIGN PATENTS

| | | |
|---|---|---|
| 55,382 | France | Jan. 9, 1952 |